United States Patent [19]

Franz

[11] 4,337,818
[45] Jul. 6, 1982

[54] VEHICLE TEMPERATURE CONTROL SYSTEM

[75] Inventor: Rudolph J. Franz, Schaumburg, Ill.

[73] Assignee: Eaton Corporation, Cleveland, Ohio

[21] Appl. No.: 50,022

[22] Filed: Jun. 18, 1979

[51] Int. Cl.³ ............................................. F25B 13/00
[52] U.S. Cl. .......................................... 165/2; 165/23; 165/28; 165/43; 62/323.4; 236/87
[58] Field of Search .................. 236/87; 165/23, 28, 165/31, 32, 39, 42, 43, 2; 62/323 C

[56] References Cited

U.S. PATENT DOCUMENTS

| | | | |
|---|---|---|---|
| 3,315,730 | 4/1967 | Weaver et al. | 165/23 |
| 3,724,230 | 4/1973 | Muto et al. | 62/323 C X |
| 3,759,058 | 9/1973 | Jacobs | 62/323 C X |
| 4,135,368 | 1/1979 | Mohr et al. | 62/323 C X |

Primary Examiner—Samuel Scott
Assistant Examiner—Margaret A. Focarino
Attorney, Agent, or Firm—C. H. Grace; R. A. Johnston; J. G. Lewis

[57] ABSTRACT

A heating and air conditioning control system havng a compressor clutch cycle control feature for controlling the in-car temperature of a vehicle passenger compartment is disclosed. The system comprises an automatic temperature control (ATC) sensor (32) which provides a modulated vacuum control signal for a vacuum motor (38). The vacuum motor has an output which adjusts a biasing element in an electrical switch (82), resulting in on/off duty cycling of an electrically energizable clutch (28) which transmits power from the vehicle engine to the air conditioner compressor (26). The percentage of time that the compressor is on versus the time off is a function of the control signal which is, in turn, a function of the ambient, in-car, and manually selected set point temperatures sensed by the ATC sensor. At ambient temperatures below a predetermined minimum, the ATC sensor produces a control signal which shuts off the compressor and places the system in a heating mode, thereby preventing needless cooling of ambient air prior to heating. During the cooling mode, the refrigeration unit compressor is energized only as needed to maintain the passenger compartment at the set-point temperature, thus minimizing power usage.

4 Claims, 7 Drawing Figures

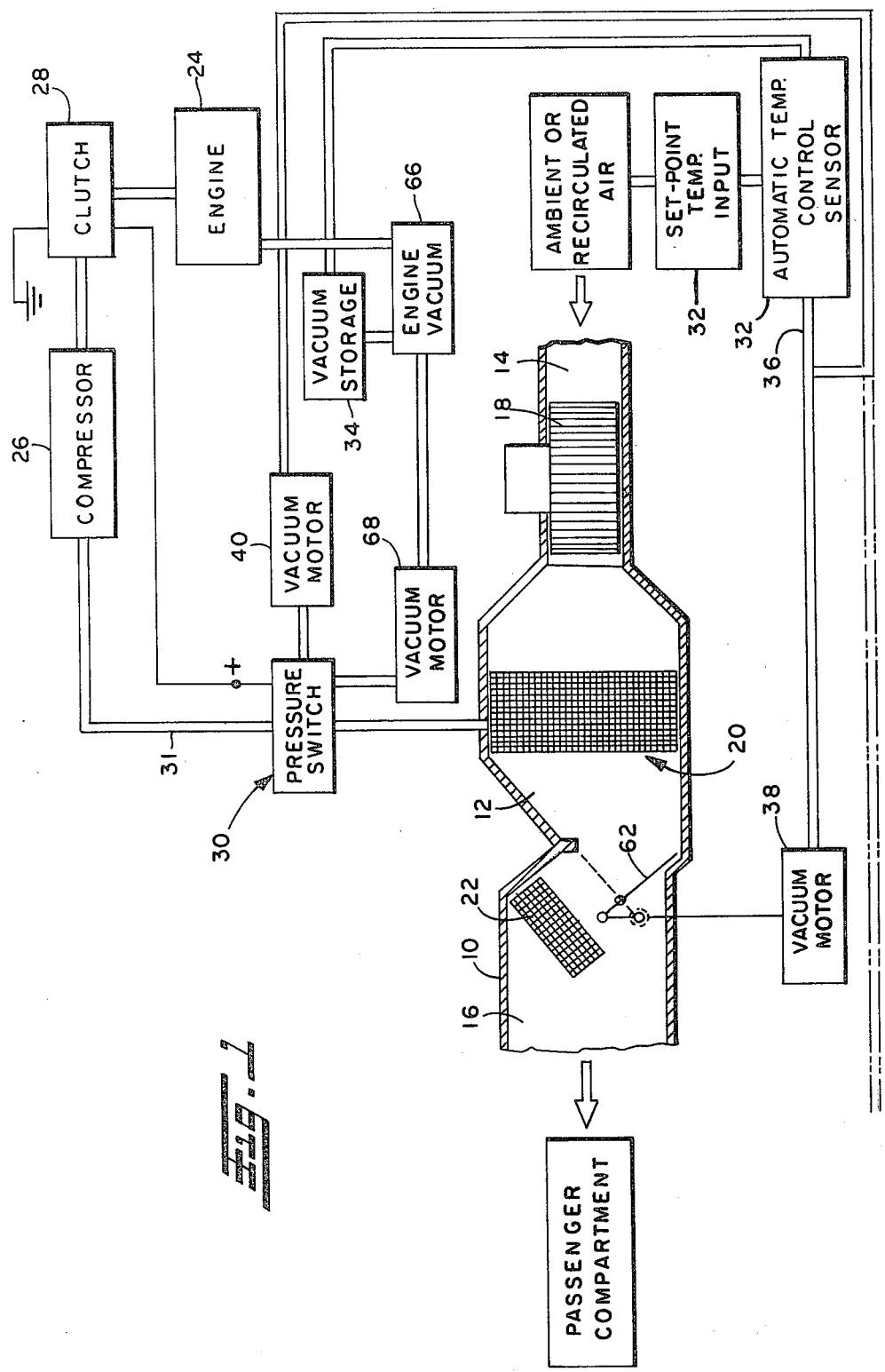

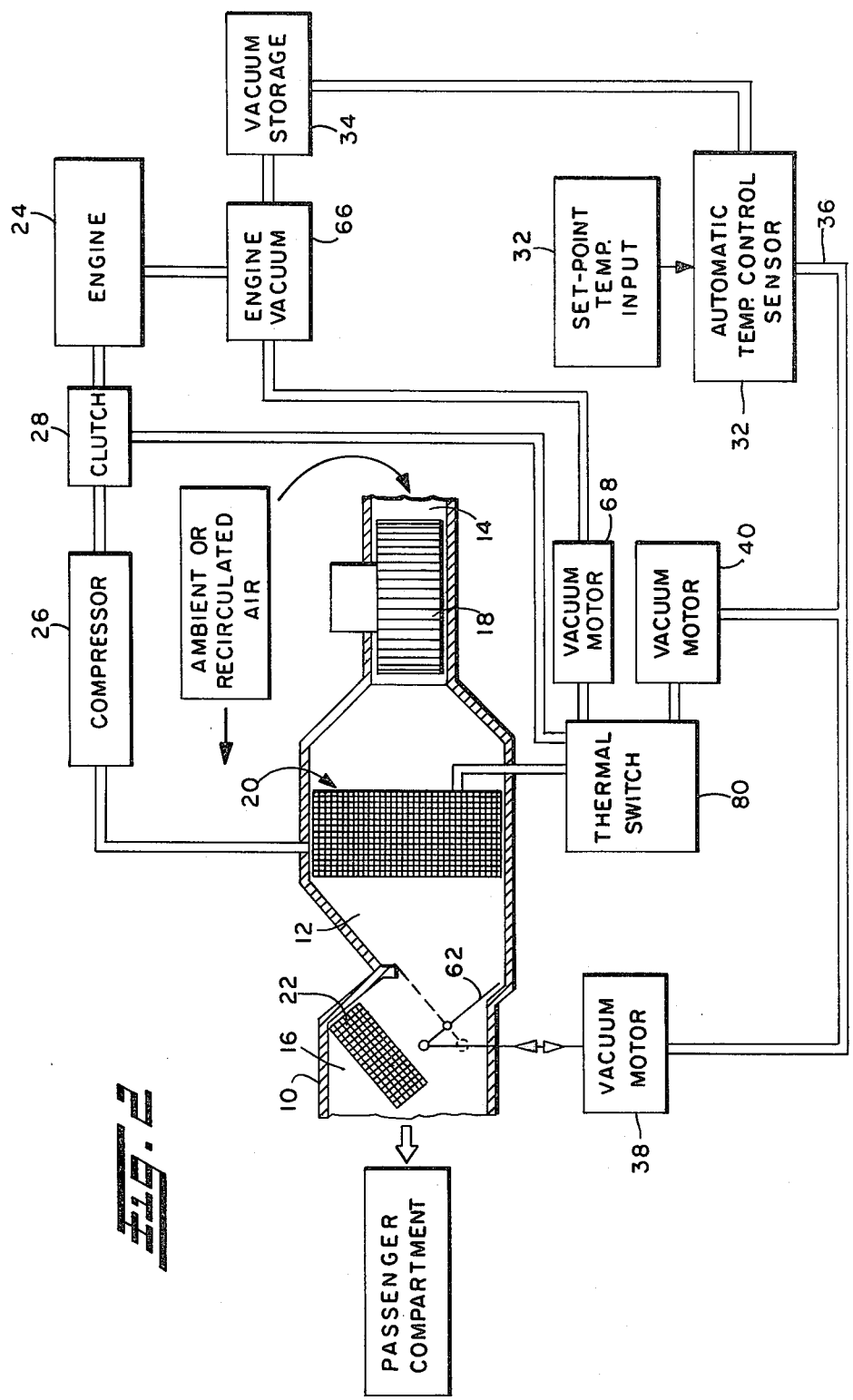

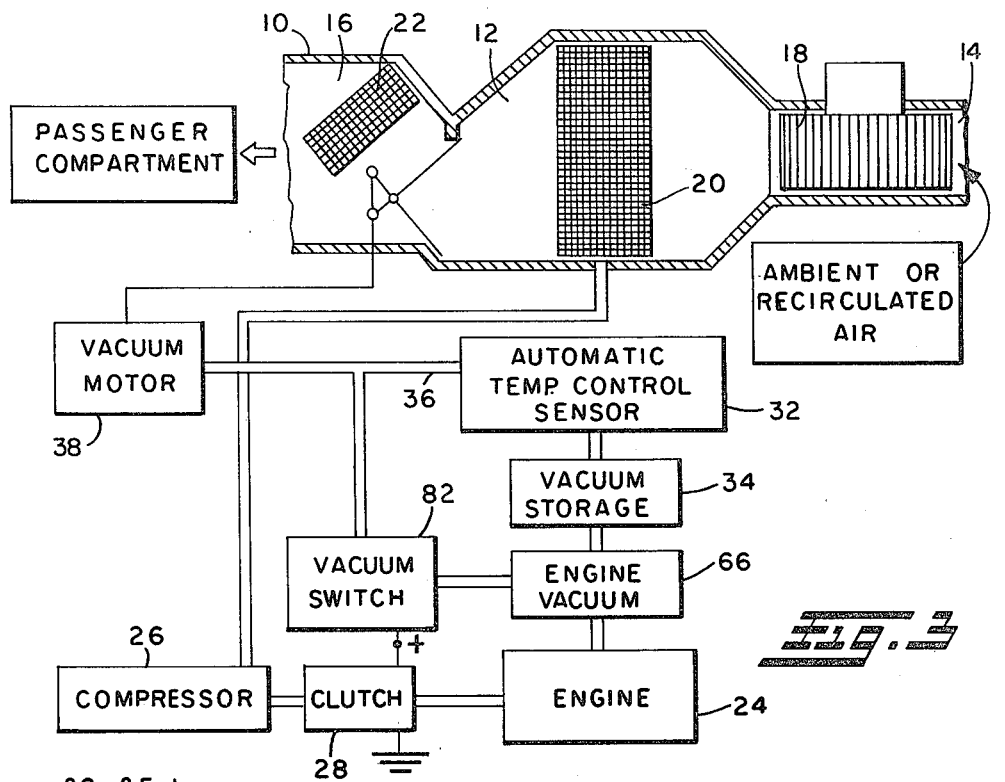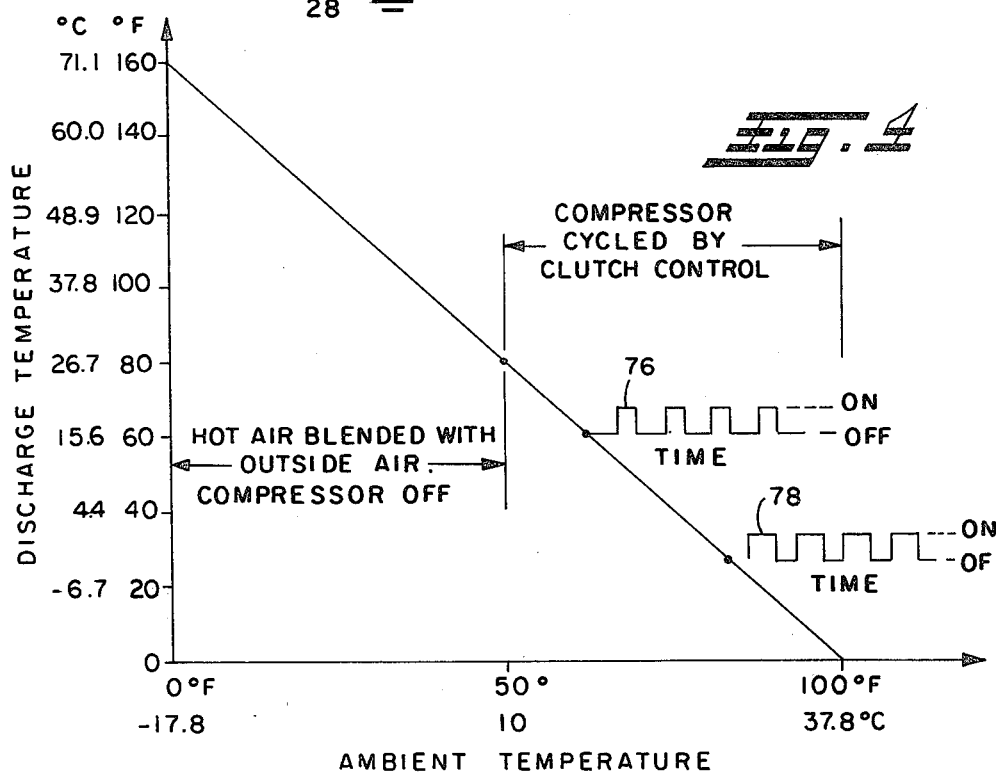

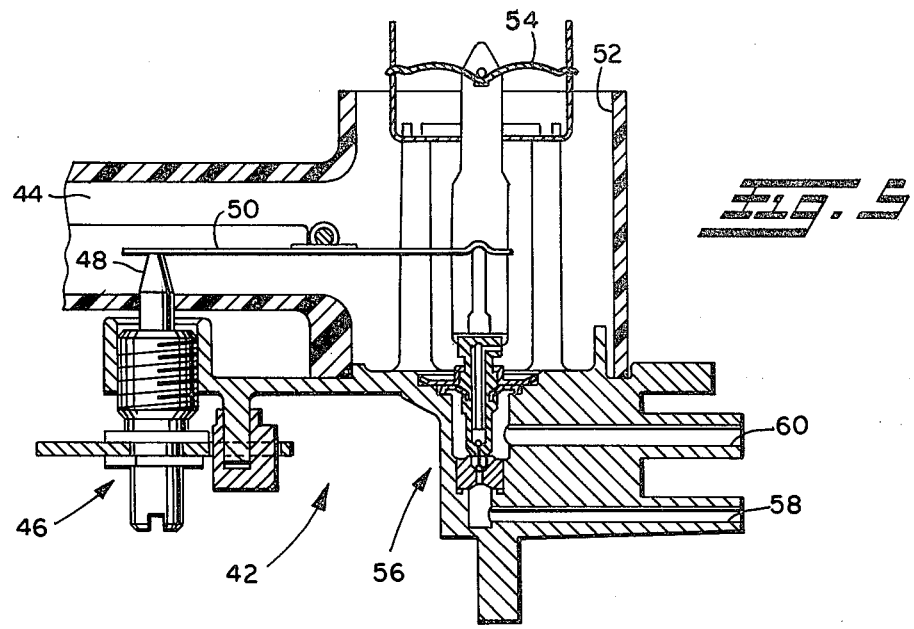
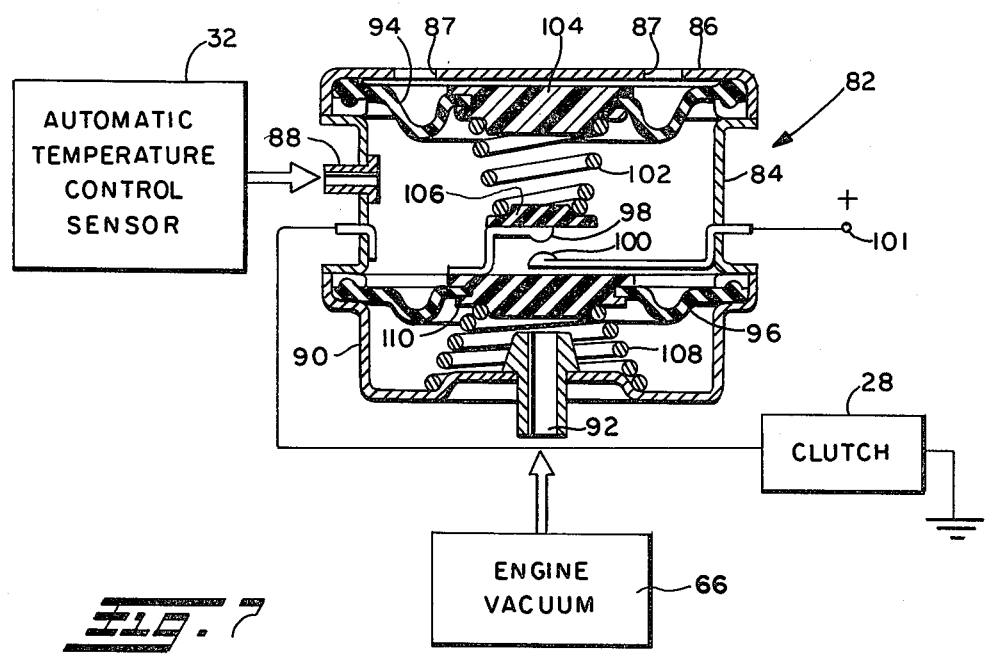

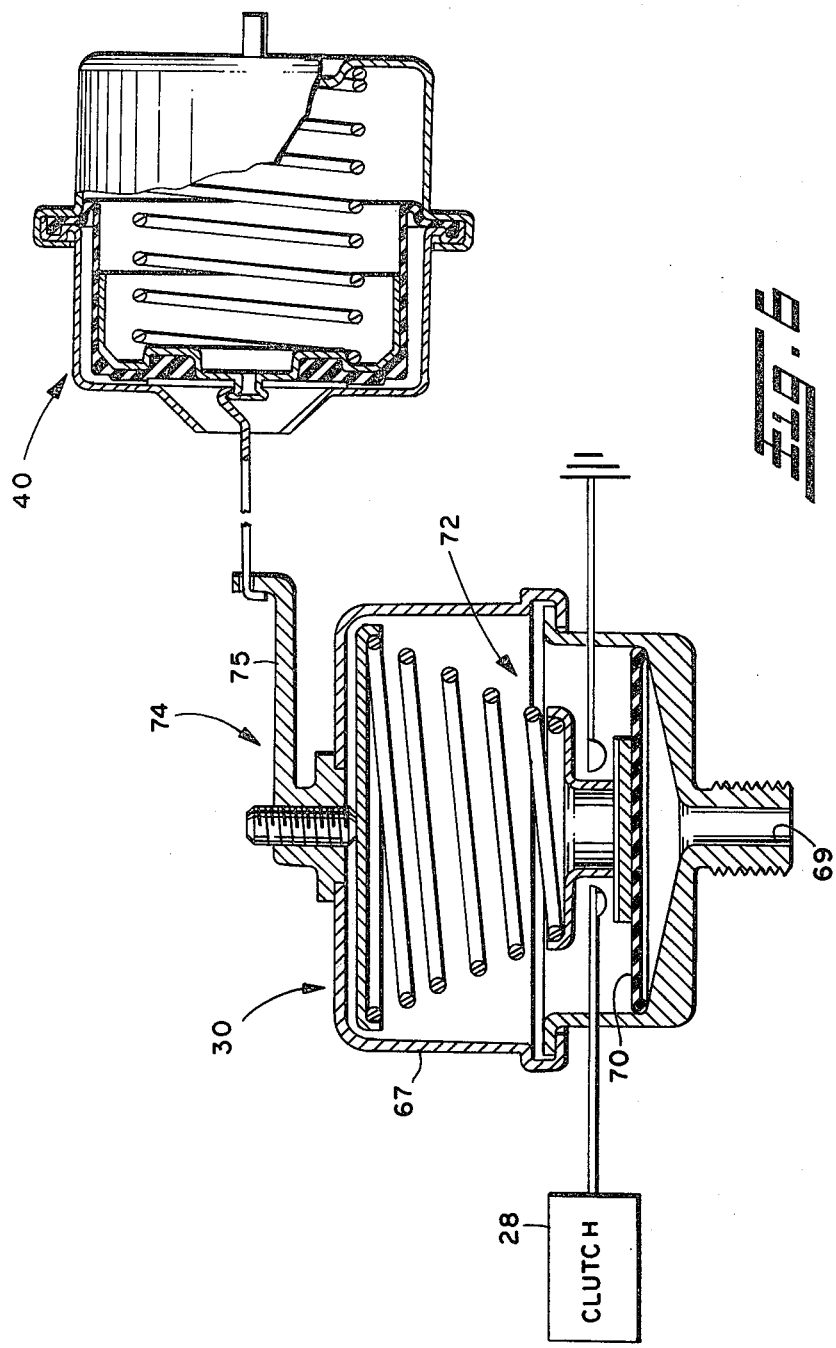

VEHICLE TEMPERATURE CONTROL SYSTEM

BACKGROUND OF THE INVENTION

This invention relates to automotive vehicle heating and air conditioning systems and, more particularly, to air conditioning systems for use in vehicle types which must conform to rigid fuel economy standards and also in those vehicles where accessory equipment power demands must be minimized.

DESCRIPTION OF THE PRIOR ART

Known heating and air conditioning systems presently in widespread use in many passenger vehicles have heretofore utilized refrigeration units which inocorporate a continuously driven compressor. Continuous power is supplied to the compressor by a drive belt-pulley arrangement directly connected to the vehicle engine. This type of system also employed a heater core kept continuously heated by high temperature fluid from the engine cooling system. Temperature controlled air could then be supplied to the passenger compartment by proportioning the amount of heated air flowing over the heater core with the amount of cooled air flowing over the evaporator cooling coil of the refrigeration unit by changing the angular position of a blend door located at the junction of hot and cold air plenums. At various times when the ambient temperature and in-car temperature were below certain levels, the blend door would be positioned to direct a flow of air to the heater core, however, the refrigeration unit compressor continued to run, resulting in needless cooling of the air prior to reheating. This placed a needless power drain on the engine and consequent waste of fuel.

Another known system uses a manually adjustable in-car temperature selector for adjusting a temperature sensitive switch responsive to the evaporator temperature of the air conditioning refrigeration unit. An adjustable biasing element within the switch functions to establish an on-off duty cycle of operation for the refrigeration unit compressor by alternately energizing and de-energizing an electro-magnetic clutch connected between the compressor and the vehicle engine. The time that the clutch is energized for driving the compressor is determined by the switch biasing effect which urges the switch to a closed position and the temperature of the evaporator. This semi-automatic system was generally ineffective for automatically controlling the in-car temperature to a preselected value because the steady state temperature achieved in the car by this system was directly dependent upon intermittent manual adjustment by the operator.

SUMMARY OF THE INVENTION

The present invention provides an automatic temperature control system which automatically on-off cycles a clutch for connecting a vehicle engine and a refrigerant compressor of the vehicle cooling system unit. The control system includes an automatic temperature control (ATC) sensor which generates a pneumatic control signal in response to the ambient temperature exteriorly of the vehicle, the in-car temperature, and a desired temperature selected by the driven, known as a set-point temperature. The control signal, operates a vacuum motor having an output motion connected to the bias adjustment of a pressure responsive switch in a first embodiment of the invention, a temperature responsive switch in a second embodiment, or a pneumatically actuated switch in a third embodiment. The respective switch in each embodiment controls the energization of a clutch for drivingly connecting the vehicle engine to the refrigeration system compressor. The pressure and temperature responsive switches are connected, respectively, to the refrigerant line of the compressor and the exterior surface of the evaporator core through which the refrigerant circulates. A spring biasing arrangement is associated with the switches and functions to maintain the switch in a closed position within a preselected range of temperatures and in an open position at temperatures below the preselected range. The amount of time that the switch remains closed versus the amount of time the switch remains open is dependent upon the magnitude of the control signal from the automatic temperature control sensor.

At higher in-car and ambient temperatures, the on-off duty cycle of the compressor clutch is characterized by a greater percentage of "on" time versus "off" time while at lower in-car and ambient temperatures, the duty cycle is characterized by a greater percentage of "off" time versus "on" time. The invention control system thus provides a source of cold air only as needed to the vehicle passenger compartment, and also controls the amount of power needed by the refrigeration system when operating to cool the passenger compartment.

The invention also provides a means for disengaging the clutch during periods of relatively high engine acceleration in order that full engine power is available for accelerating the vehicle.

It is an object of the present invention to provide an automatic temperature control system which is intermittently energized by cycling a clutch drivingly connecting the vehicle engine and the compressor of the refrigeration unit in order to confine power usage to the compressor only during intervals when the in-car temperature exceeds an operator selected set-point temperature.

It is another object of the invention to provide a temperature control system which de-energizes the refrigeration unit compressor during periods of vehicle acceleration in order that full engine power is available for vehicle acceleration.

It is a further object of the invention to provide a temperature control system which automatically shuts off the compressor clutch as the refrigerant evaporator temperature falls below 32 degrees Fahrenheit thereby preventing evaporator "freeze up" and blockage of air flow to the passenger compartment.

BRIEF DESCRIPTION OF THE DRAWINGS

FIG. 1 is a diagrammatic representation of a first embodiment of the invention control system having a refrigerant pressure responsive switch controlling the compressor clutch;

FIG. 2 is a diagrammatic representation of a second embodiment of the invention similar to FIG. 1 having a thermally responsive switch controlling the compressor clutch;

FIG. 3 is a diagrammatic representation of a third embodiment of the invention wherein a vacuum switch controlled by an automatic temperature control sensor controls the compressor clutch duty cycle;

FIG. 4 is a graph of discharge air temperature to the passenger compartment versus ambient or outside air showing a temperature zone of operation for the air conditioner compressor, the temperature range at which heated air is modulated with outside or recirculated air, and two plots superimposed on the discharge temperature line showing the on/off duty cycle duration versus time at two temperature positions.

FIG. 5 is a cross-sectional view of a known automatic temperature control sensor having a set point temperature selector and a pneumatic modulating valve for generating an output control signal;

FIG. 6 is a schematic drawing illustrating a typical pressure responsive switch shown in association with the compressor clutch and a vacuum motor controlled biasing adjustment to the pressure responsive switch; and FIG. 7 is a cross-sectional view of a pneumatically controlled switch having a vacuum override feature shown in association with schematically represented control system components.

DETAILED DESCRIPTION

Referring now to FIG. 1, a heating and air conditioning system is shown schematically as including a housing or air duct 10 defining a fluid passageway 12 having an air inlet 14 at the right end thereof and an air outlet 16 at the other end. A motor driven blower 18 is mounted in air inlet 14 and functions to force ambient or recirculated air through fluid passageway 12 to the passenger compartment of the vehicle. An evaporator core of a typical air conditioning unit, indicated generally by reference numeral 20, is mounted within fluid passageway 12. A heater core 22 is mounted within fluid passageway 12 and downstream from evaporator 20 and functions to transfer heat from the cooling fluid of a liquid cooled engine, shown schematically by reference numeral 24. For simplicity, the fluid line connections between the engine 24 and heater core 22 are not shown. A compressor 26 is connected between an electrically operated clutch 28 and evaporator core 20. A pressure switch 30 responsive to refrigerant pressure flowing from compressor 26 is connected along a fluid line 31 to evaporator core 20. For simplicity, the return path of the refrigerant from the evaporator 20 to compressor 26 and remaining associated refrigeration components are not shown, their being well known in the art of refrigeration and air conditioning. An automatic temperature control sensor 32 (ATC sensor) is shown as having a connection to a vacuum storage reservoir 34 and an outlet control line 36 which conveys a pneumatic control signal to standard vacuum motors 38 and 40. ATC sensor 32 can be of the type shown and described in U.S. Pat. Nos. 3,770,195 or 3,831,841, both of which are assigned to the assignee of the present invention. As illustrated by FIG. 5, a typical ATC sensor, indicated generally by reference numeral 32, is shown in cross section as including an ambient air passage 44, an operator controlled set-point temperature selector arrangement, indicated generally by reference numeral 46, having an output pin 48 in contact with a pivotally mounted bimetal element 50 located in ambient passage 44. The ATC sensor 42 further includes an in-car air passageway 52 in which is mounted another bimetal element 54. A modulating valve arrangement, indicated generally by reference numeral 56 functions to control and modulate a vacuum supply inlet 58 with a vacuum outlet or control line 60. Bimetal elements 50 and 54 are operably connected to vacuum modulator valve 56 and in cooperation with set-point temperature selector 46 function to generate a control signal at control line 60 which is a function of the ambient air temperature sensed by bimetal 50, the in-car temperature sensed by bimetal 54, and the set-point temperature selector output which places a preload on bimetal 50. The general operation of sensors of the type shown by FIG. 5 is based on a balancing of forces which occurs when the in-car temperature is equivalent to the set-point temperature. Whenever the in-car temperature varies from the set-point temperature, a force imbalance occurs resulting in actuation of vacuum modulator valve 56 and a change in the fluid pressure of control line 60. The magnitude of the signal in control line 60 is then used to operate control elements of the heating and air conditioning system as will now be described in greater detail.

Returning now to FIG. 1, vacuum motor 38 is shown as being connected to a blend door 62 which is pivotally mounted within housing 10 and movable between a first position as shown by the dashed lines of FIG. 1 whereby air flow through passageway 12 is deflected away from heater core 22, thereby substantially preventing heat transfer from the core 22 to the air circulating therethrough. Also shown schematically by FIG. 1 are an engine vacuum source 66 and a vacuum motor 68 in direct fluid communication therewith.

Referring now to FIG. 6, pressure switch 30 and vacuum motor 40 of the embodiment of FIG. 1 are shown in greater detail. Pressure switch 30 includes a housing 67, a fluid port 69 connectable to refrigerant line 31, a diaphragm 70 extending across the lower portion of housing 67, a spring biased switch arrangement indicated generally by reference numeral 72, and a rotatable arm bias adjustment mechanism indicated generally by reference numeral 74 which is operable to adjust the bias on switch 72. The input arm 75 of bias adjustment mechanism 74 is connected to the output of vacuum motor 40, which is well known in the art and will not be described in further detail. In operation, the pressure beneath diaphragm 70 at which the switch contacts move to a closed position is then a function of the opposing force developed by the spring biasing which is in turn adjustable by actuation of vacuum motor 40 acting through bias adjustment mechanism 74. Downward movement of the biasing spring increases the pressure on diaphragm 70 required to close the switch contacts.

The operation of the control system will now be described for the embodiment of FIG. 1, with reference also being made to the graph of FIG. 4. As stated above, two of the primary purposes of the invention control system are to limit the amount of power delivered to the refrigeration unit compressor 26, and to shut down completely the operation of the refrigeration unit below a predetermined ambient temperature. The temperature at which the compressor 26 remains completely shut down is shown in FIG. 4 by the vertical line aligned with a 50 degree F. (10 degrees C.) ambient temperature. The operation of the system will first be described for ambient temperatures between 50 degrees Fahrenheit (10 degrees C.) and 100 degrees Fahrenheit (37.8 degrees C.). During this range of ambient temperatures ATC sensor 32 automatically compares the ambient temperature to the operator adjusted set point temperature and the in-car temperature. A pneumatic control signal is automatically produced and conveyed to vacuum motor 40 which adjusts the biasing load on diaphragm 70 a predetermined amount in proportion to the temperatures sensed by ATC sensor 32.

Ambient or recirculated air passing over the evaporator core 20 causes the refrigerant pressure to vary according to the amount of heat absorbed thereby. As the evaporator core temperature increases the refrigerant pressure sensed by pressure responsive switch 30 increases until the switch contacts close causing energization of clutch 28 and operation of compressor 26. Compressor 26 will then continue to run for a predetermined time period until the evaporator core temperature decreases resulting in a consequent decrease in refrigerant pressure thereby permitting the biasing arrangement to open the switch contacts of pressure switch 30 resulting in de-energization of clutch 28.

The amount of time that clutch 28 is energized versus the amount of time that it is de-energized is a function of the calibration of pressure switch 30 which is also a function of the amount of biasing adjustment input from vacuum motor 40. As stated above, the amount of biasing adjustment from vacuum motor 40 is determined by the output pneumatic signal from ATC sensor 32 and is ultimately determined by the temperature and flow rate of discharge air necessary to cool the vehicle for a given ambient temperature and in-car temperature. In general, at high ambient and in-car temperatures, the biasing effect will be less, permitting the pressure responsive switch 30 to remain closed for a longer period of time than it remains open. At lower ambient and in-car temperatures the biasing effect is greater, causing the switch 30 to remain open for a period of time greater than it is closed.

Superimposed upon the FIG. 4 graph of discharge temperature versus ambient temperature are two on/off duty cycle plots of compressor-clutch operation versus time for temperatures between 50 degrees and 100 degrees Fahrenheit. Plot 76 schematically represents a clutch on/off duty cycle in which the compressor on time represents less than half of the period time; whereas, the plot represented by reference numeral 78 shows an on/off duty cycle in which the compressor runs for a greater percentage of the total period of operation, and hence the discharge temperature is approximately 30 degrees F. (−1.1 degree C.). It should be noted that during system operation at ambient temperatures of 50 degrees F. (10 degrees C.) and above blend door 62 remains in its fully open position, as shown by the dashed lines of FIG. 1, thereby substantially shielding the flow of already cooled air from needless circulation against heater core 22 which would decrease the efficiency of the cooling made of system operation by requiring the compressor to run for longer periods of time. At ambient temperatures below 50 degrees F. (10 degrees C.) the heating mode of system operation begins and switch 30 remains de-energized, thereby deactivating compressor 26 and preventing unncessary cooling of ambient air prior to heating by heater core 22 thus saving the engine power which would otherwise be expended to compress and circulate refrigerant to effect cooling.

During the heating mode of sysfem operation, vacuum motor 38, similar in construction to vacuum motor 40 of FIG. 6, moves blend door 62 to a position which deflects a portion of ambient air flow toward heater core 22 resulting in an increased discharge temperature to the passenger compartment. The amount of air deflected against heater core 22 is a function of the in-car temperature, the set-point temperature, and the ambient temperature. As shown by the graph of FIG. 4, the resultant discharge temperature increases as the ambient temperature decreases.

The system of FIG. 1 also incorporates a compressor cut-out feature which is responsive to predetermined vehicle accelerations. Compressor cut-out is achieved by second vacuum motor 68 which is connected to bias adjustment 74 by means of a linkage, not shown. Under hard acceleration the engine vacuum decreases causing the output of vacuum motor 68 to rotate the bias adjustment 74 in a direction to effect an increase in the spring bias force acting to open the switch contacts, thereby de-energizing clutch 28 and shutting down compressor 26.

Referring now to FIG. 2, a second embodiment of the invention is schematically illustrated which is similar to the embodiment of FIG. 1 except that the pressure switch 30 of the FIG. 1 embodiment has been replaced by a thermally responsive switch 80. Switch 80 may be of any suitable construction known in the art and is preferably of the type having a temperature responsive capillary element in fluid communication with a flexible diaphragm which is, in turn, connected to an over center spring for acutating an electrical switch connected to clutch 28. This particular type of switch is well known in the art, and therefore, a detailed description of its construction and operation has been omitted. The function of the FIG. 2 embodiment is identical to that of FIG. 1 except that the clutch on/off duty cycle is a function of varying evaporator core temperatures rather than pressure. It will be understood by those skilled in the art that thermal switch 80 may also incorporate a suitable adjustment feature comparable to that shown by FIG. 6 for altering the biasing effect on the switch.

Referring now to FIG. 3, there is illustrated a third embodiment of the invention wherein the compressor clutch 28 is cycled by a vacuum switch 82 which is not connected directly or indirectly to either heater core 22 or evaporator core 20, but is controlled directly by ATC sensor 32. There is shown in FIG. 7 a diagrammatic representation of a suitable vacuum switch 82 comprising a central housing section 84, a housing end cap 86 having perforations 87 therein for communicating atmospheric air therethrough, a fluid port 88 through central housing 84, a lower housing 90, and a fluid port 92 connected directly to engine vacuum source 66. An upper diaphragm member 94 is sealingly connected between end cap 86 and central housing section 84, a lower diaphragm 96 is sealingly connected around its outer periphery between central housing 84 and lower housing 90, and switch contacts 98 and 100 are connected on either side of central housing 84. A biasing spring 102 has its upper end seated against an insert 104 disposed in the central region of diaphragm 94 and its lower end seated against a reaction member 106 which is connected to switch contact 98. A lower biasing spring 108 has its lower end seated against lower housig 90 and its upper end seated against a centrally located insert 110 which is connected to diaphragm 96.

In operation, vacuum switch 82 responds to an increasing vacuum signal (lower absolute pressure) from ATC sensor 32 applied through port 88 by moving switch contact 98 into contact with switch contact 100 thereby closing the circuit between contact terminal 101, which is adapted for connection to a power source, not shown, and clutch 28 for energizing clutch 28. The switch contacts 98 and 100 will remain in a closed position until the in-car temperature falls below a predetermined value, at which point the control signal from ATC sensor 32 will increase in absolute pressure (lower vacuum), thereby permitting diaphragm 94 to lift upwardly causing switch contact 98 to be spaced from contact 100. Thus, vacuum switch 82 is on/off cycled by ATC sensor 32 resulting in an on/off duty cycle for the embodiment of FIG. 3 similar to plots 76 and 78 of FIG. 4.

The lower portion of vacuum switch 82 functions as an acceleration cut-out by overriding any signal from ATC sensor 32 which tends to close switch contacts 98 and 100 as will be hereinafter described. During periods of vehicle acceleration the engine vacuum level decreases sharply causing the absolute pressure in the chamber beneath diaphragm 96 to increase resulting in upward movement of diaphragm 96 under the bias of spring 108 and consequently opening of switch contacts 98 and 100. This acceleration cut-out feature is comparable in function to the acceleration cut-out feature described above for the FIG. 1 and FIG. 2 embodiments of the invention control system.

Various modification and alterations of this invention will become apparent to those skilled in the art without departing from the scope of this invention.

What is claimed is:

1. A system for automatically controlling vehicle passenger compartment cooling having a refrigerant circulator and an air heat exchanger receiving said refrigerant for maintaining the compartment at a desired temperature, said control system comprising:
   (a) selector means operative upon actuation by the vehicle occupant to select a desired passenger compartment temperature and provide an output indicative of the desired temperature;
   (b) temperature sensing means receiving said selector output and sensing ambient temperature and the air temperature within said compartment, said temperature sensing means being operative to provide a modulated control signal having certain characteristics thereof indicative of the difference between the air temperature in said compartment and said desired temperature;
   (c) clutch means engageable and disengageable for selectively connecting and disconnecting said refrigerant circulator from an on-board source of power;
   (d) actuator means receiving said control signal from said sensing means and operative in response to said certain characteristics thereof, to cycle said clutch means between said connected and disconnected mode for regulating the temperature of said refrigerant circulated to said heat exchanger;
   (e) means for flowing air over said heat exchanger for effecting cooling of the passenger compartment, wherein said sensor means upon sensing ambient temperatures below a predetermined value, at which cooling of the compartment is not required, provides a control signal for maintaining said clutch means disengaged.

2. In an automatic temperature control system of the type used in automotive vehicle heating and air conditioning systems having: a refrigeration unit comprising a compressor driven by the vehicle engine, an evaporator core, and a heater core fluidly in common with the engine cooling system; a housing having a fluid passageway for directing ambient air or recirculated air against the evaporator core, heater core, and to the passenger compartment; a blower for flowing said air through the housing; a blend door for modulating the amount of air flowing over the heater core; and an automatic temperature sensor having a set point temperature selector and a pneumatic output control signal responsive to the ambient temperature, the in-car temperature, and the set point temperature, wherein the improvement comprises:
   (a) clutch means energizable for transmitting power from the vehicle engine to the compressor; and
   (b) means for on/off cycling said clutch means, said cycling means responsive to the magnitude of the pressure control signal from said automatic temperature sensor such that said cycling means energizes said clutch means as the temperature in the passenger compartment rises above said set point temperature, said cycling means de-energizing said clutch means as the temperature in the passenger compartment falls a predetermined amount below said set point temperature, said cycling means maintaining said clutch means de-energized in response to a control signal from said temperature sensor at ambient temperatures sensed below a predetermined value, whereupon said air conditioning unit no longer draws power from the vehicle engine; and,
   (c) means responsive to said control signal at ambient temperatures above said predetermined value operative to position said blend door to prevent air flow over the heater core at temperatures of above said predetermined value, said actuator means positions said blend door to prevent air flow over said heater core.

3. An automatic temperature control system for controlling the air temperature of a vehicle passenger compartment, said system comprising:
   (a) housing means defining a fluid passageway;
   (b) heater core means associated with the cooling system of said vehicle for transferring heat to air flowing therearound;
   (c) refrigeration means, said refrigeration means including a compressor and evaporator core, said evaporator core absorbing heat from air flowing therearound;
   (d) said heater core means and said evaporator disposed in said fluid passageway;
   (e) means for circulating air through said fluid passageway;
   (f) means for modulating air flow around said heater core means;
   (g) means actuable by the vehicle occupant for selecting a set point temperature at which the air in said compartment is to be maintained;
   (h) temperature sensing means responsive to said set point selecting means for sensing the air temperature within said compartment and the ambient air temperature exteriorly of said vehicle, said temperature sensing means including means for generating a control signal having a magnitude responsive to the ambient air temperature, the air temperature in said compartment, and said set point temperature;
   (i) clutch means energizable for transmitting power from the engine of said vehicle to said compressor; and
   (j) means for on/off cycling said clutch means, said cycling means responsive to said control signal such that said cycling means energizes said clutch means as the in-car temperature sensed by said temperature sensing means rises above said set point, said cycling means de-energizing said clutch means as the in-car temperature falls below said set point temperature, wherein said cycling means maintains said clutch means de-energized in response to a control signal from said temperature sensing means as ambient temperatures below a predetermined value are sensed by said temperature sensing means below a predetermined value, whereupon said air conditioning unit no longer draws power from the vehicle engine; and (k) said modulating means responsive to said control signal at temperatures below said predetermined value for directing a controlled amount of air flow against said heater core for regulating said passenger compartment at set point temperature.

4. A method of automatically controlling the air temperature in a vehicle passenger compartment, said method comprising:

(a) providing a housing having a fluid passageway communicating with said compartment, (b) flowing ambient air through said fluid passageway;

(c) providing a heater core in said fluid passageway for transferring heat to flowing air;

(d) providing energizable refrigerating means for cooling air flowing through said passageway;

(e) selecting a set point temperature at which the air in said compartment is to be maintained;

(f) sensing the air temperature within said compartment and the ambient air temperature exteriorly of said vehicle, said sensing step including generating a control signal having a magnitude responsive to the ambient air temperature, the air temperature in said compartment, and said set point temperature;

(g) cycling said refrigerating means in a preselected cycle pattern in response to said control signal as the passenger compartment temperature rises above said set point temperature;

(h) modulating said on/off cycling means as the in-car temperature falls below said set point temperature;

(i) de-energizing said clutch in response to a control signal indicative of ambient temperatures below a predetermined value, whereupon said refrigeration means is maintained de-energized; and (j) directing a modulated air flow over said heater core in response to said control signal at temperatures below said predetermined value for heating said compartment.

* * * * *